United States Patent [19]
Garis, Jr.

[11] Patent Number: 5,286,116
[45] Date of Patent: Feb. 15, 1994

[54] BEARING ASSEMBLY

[75] Inventor: Chester A. Garis, Jr., Gloucester, Va.

[73] Assignee: Newport News Shipbuilding and Dry Dock Company, Newport News, Va.

[21] Appl. No.: 938,420

[22] Filed: Aug. 31, 1992

[51] Int. Cl.$^5$ .............................................. F16C 17/10
[52] U.S. Cl. .................... 384/271; 384/272; 384/264
[58] Field of Search ............... 384/271, 272, 317, 269, 384/264, 267

[56] References Cited

U.S. PATENT DOCUMENTS

| | | |
|---|---|---|
| 981,881 | 1/1911 | Rhodes . |
| 2,824,275 | 2/1958 | Kober . |
| 2,915,254 | 12/1959 | Weber et al. . |
| 3,009,747 | 11/1961 | Pitzer .................... 384/272 |
| 3,106,432 | 10/1963 | Opferkuch ................ 384/271 |
| 3,114,322 | 12/1963 | Leonard, Jr. . |
| 3,195,466 | 7/1965 | Young . |
| 3,261,295 | 7/1966 | White . |
| 3,319,098 | 5/1967 | Hartman . |
| 3,591,817 | 7/1971 | Kunzle . |
| 3,762,240 | 10/1973 | Adams .................... 384/272 |
| 3,777,590 | 12/1973 | Parkes . |
| 4,295,268 | 10/1981 | Punshon et al. . |
| 4,715,731 | 12/1987 | Tittizer . |
| 4,959,578 | 9/1990 | Varga . |

Primary Examiner—Lenard A. Footland
Attorney, Agent, or Firm—Lalos & Keegan

[57] ABSTRACT

An improved motor and bearing assembly is provided for use in an axial gap electric motor. The motor and bearing assembly includes a bearing support, bearing cones circumferentially mounted on the bearing support and a rotating bearing member. Each bearing cone has an axial conical surface at one end. The conical surfaces face each other to form a V-shaped cross-sectional groove. The rotating bearing member includes two rotating bearing rings abutting one another, each ring having an angularly disposed surface forming a V-shaped configuration complementary to the V-shaped groove of the bearing cones. The rotating bearing member provides axial and radial support of the rotor of the axial gap electric motor. Each of the bearing cones is axially movable relative to the bearing support, thereby permitting the stator-to-rotor gap and the bearing clearance to be adjusted after final assembly. Additionally, lubrication and coolant can be introduced to the system through both a lubrication opening in the bearing support and a gap between the bearing cones.

36 Claims, 3 Drawing Sheets

BEARING ASSEMBLY

FIELD OF THE INVENTION

This invention relates generally to motor and bearing assemblies, and more particularly, to bearing assemblies for supporting a rotor in an axial gap motor.

BACKGROUND OF THE INVENTION

Various systems have been proposed for water-going vessels in which one or more propellers are disposed beneath the waterline of the vessel for semi-submersible vessels or disposed within a portion of the hull of submersible vessels. Typically, the propellers in submersible vessels have been driven by diesel power, steam turbines or electric motors mounted within the hull of a vessel. A propeller shaft extends through the hull to the propeller mounted on the shaft outside the hull. Such systems have the disadvantages of shaft vibration and noise radiating from the shaft. Further, a rotating seal is necessary where the shaft passes through the hull but this is prone to leak. Alternative systems have been suggested using shaftless electric motors mounted outside of the hull with only electric power cables passing through the hull, as shown for instance in U.S. Pat. No. 3,182,623. A disadvantage of such a system is that propulsors (electric motors and impellers) occupy almost the entire interior of the tail section. Additionally, traditional shaftless electric motors are either too small to effectively move a vessel or, if large enough, add significant weight to the vessel.

An improved marine propulsor has been disclosed in U.S. Pat. No. 5,078,628, incorporated herein by reference. The propulsor consists of a shaftless motor with disk-shaped rotor and stators mounted in the vessel structure with a blade hub mounted on the rotor. The hub includes propeller blades extending beyond the circumference of the vessel housing.

In manufacturing this improved propulsor, problems have been encountered in centering the rotor. It is difficult to achieve the proper gaps between the stators and the rotor and the proper bearing clearance at an intermediate stage of assembly. After final assembly, it is impossible to gain access to the bearing components in a conventional bearing assembly, thereby precluding the adjustment of the stator-to-rotor gaps and the bearing clearance at this stage. Thus, disassembly of the propulsor is required to adjust these gaps and clearances, a complicated and time-consuming prospect.

Accordingly, the objects of the present invention are to provide the following:

a) an improved rotor assembly for axial gap motors;

b) an improved rotor assembly permitting the axial displacement of the rotor support assembly;

c) an improved rotor assembly permitting the stator-to-rotor gaps to be adjusted after assembly; and d) an improved rotor assembly permitting the rotor bearing clearance to be adjusted without requiring the disassembly of the motor.

Other objects and advantages of the present invention will become more apparent from the following description taken in conjunction with the accompanying drawings.

DESCRIPTION OF THE PREFERRED EMBODIMENTS

Figure 1:
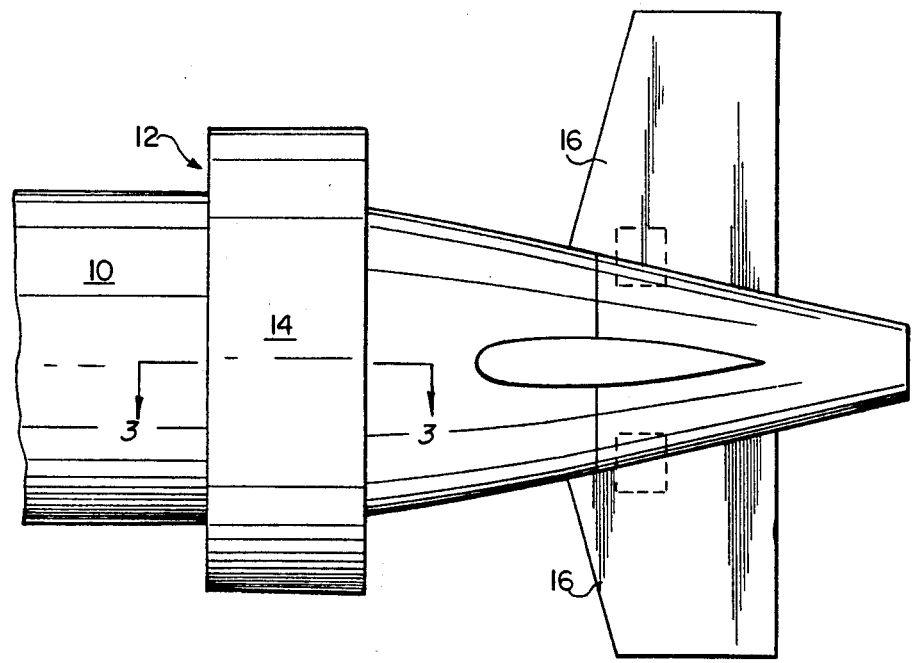
FIG. 1 is a fragmentary side elevation view of the aft section of a submersible vehicle or propulsor housing or submersible propulsor housing.

Referring to the illustration of the present invention shown in FIGS. 1-4, FIG. 1 illustrates a fragmentary view of a marine vehicle in which the present invention could be incorporated. This vehicle could be a submarine, as shown for example in U.S. Pat. No. 3,101,066, in which instance body 10 may be the vessel's hull. Alternately, the vehicle could be a surface vessel, in which instance the propulsor of the present invention may be mounted in a propulsor housing attached below the waterline, as shown for example in U.S. Pat. No. 4,389,197. In either situation, the marine propulsor of the present invention will be installed in a section 12 of body 10, having generally a cylindrical or frustum shape or configuration. Also shown in FIG. 1 is a shroud 14 covering the blades of the propulsor assembly. Fins 16 may be mounted at the end of a submersible vessel or on an attached propulsor housing.

Figure 2:
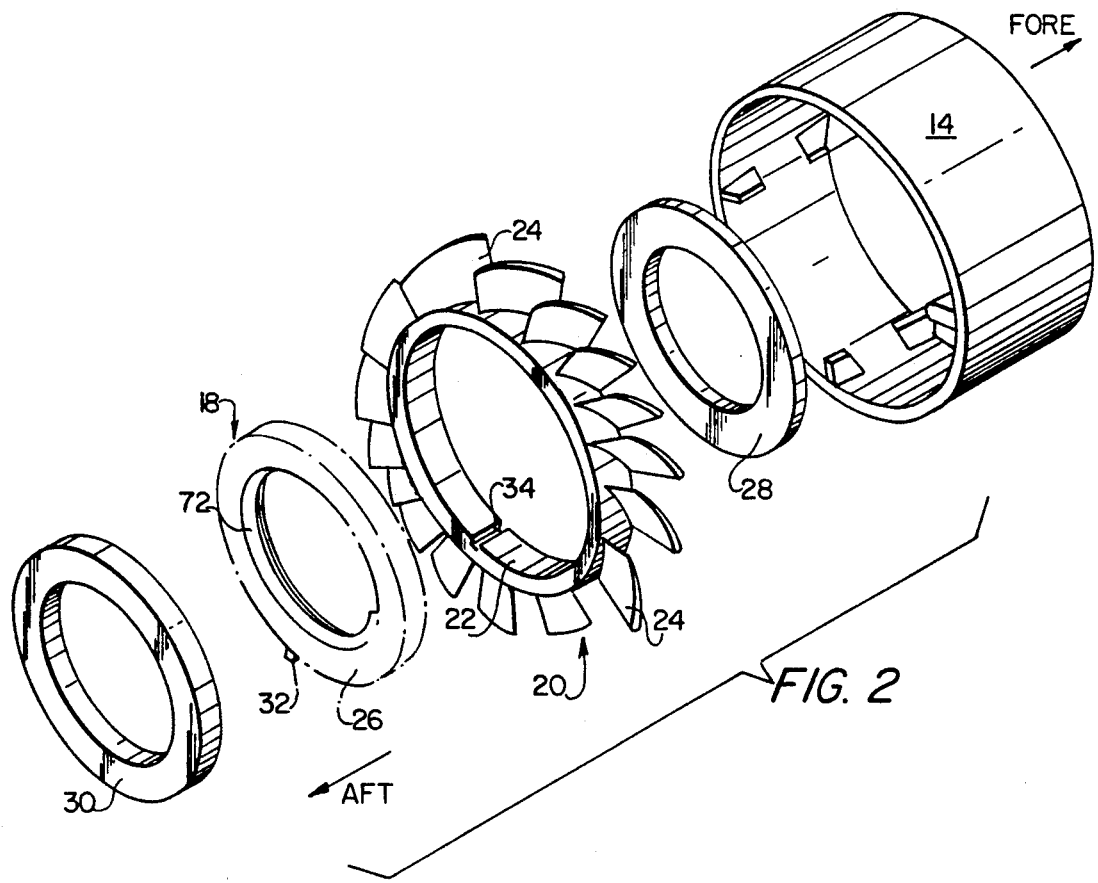
FIG. 2 is an exploded perspective, diagrammatic view of the major components of the axial gap motor and impeller of the present invention.
Figure 3:
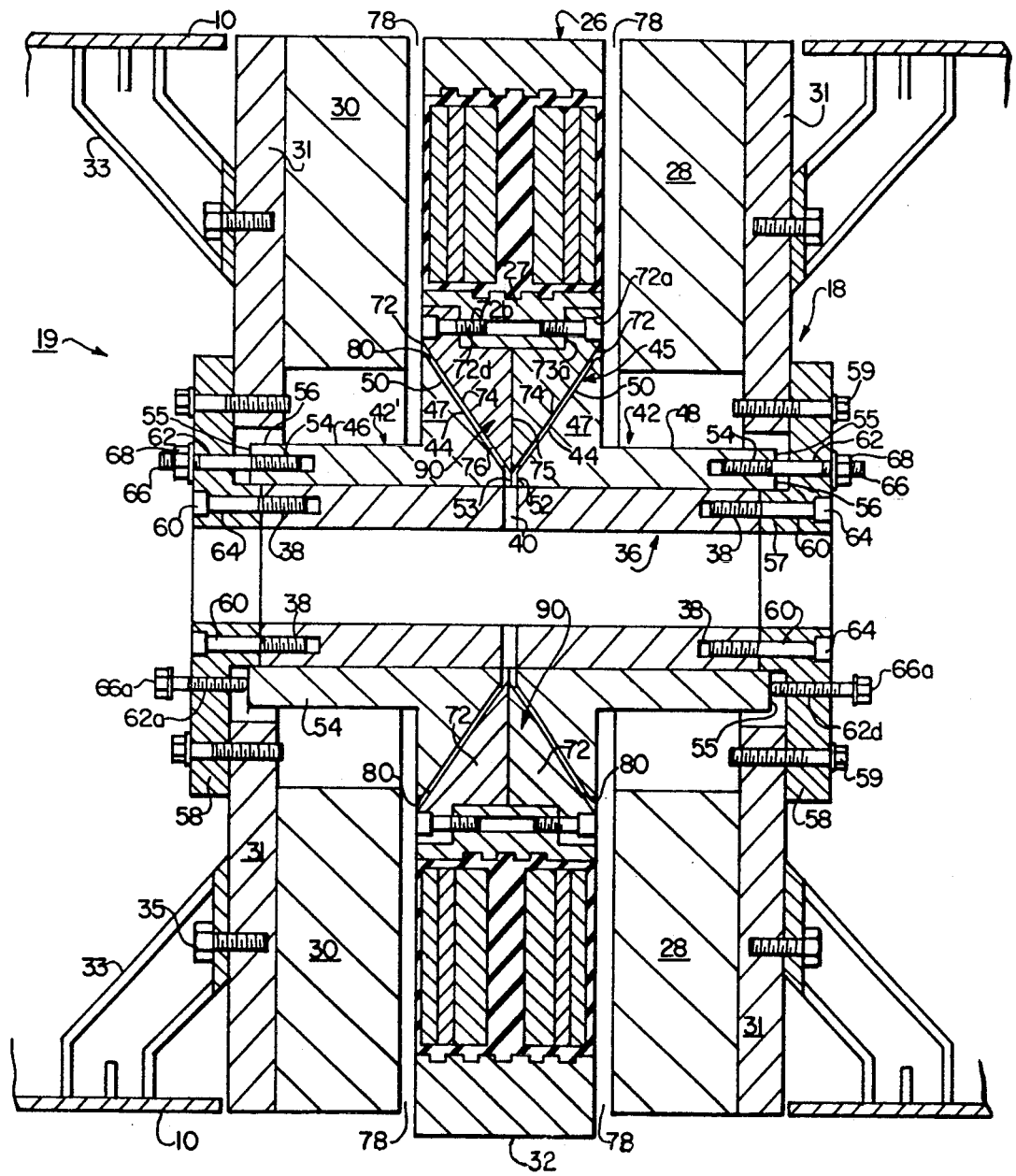
FIG. 3 is a cross-sectional view of the motor within the surrounding blade hub, taken along lines 3—3 of FIG. 1.

FIG. 2 illustrates the general relationship of the major components of the assembly, with details omitted. The propulsor generally includes an axial gap motor 18 and an impeller 20 including a blade hub 22 and blades 24. Motor 18 includes a generally disk-shaped rotor 26 with an inner periphery 27, a disk-shaped forward stator 28 and a disk-shaped rearward stator 30. Axial gap motor 18 may be mounted in the hull 10 or propulsor housing by any conventional means. One such means is shown in FIG. 3, including a pair of end plates 31 securing the stators 28 and 30 to the bearing assembly shown generally at 19. End plates 31 are mounted in the hull 10 or propulsor housing by means of brackets 33 secured to end plates 31 by fasteners 35. Blade hub 22 (FIG. 2) fits over rotor 26 with rotor key 32, shown in FIG. 2 and in FIG. 3, being received within hub key slot 34, thereby fixing hub 22 relative to rotor 26. As rotor 26 rotates, hub 22 and blades 24 are rotated through the water causing a propulsion force that is transmitted to the vessel.

Referring to FIG. 3, the bearing assembly 19 is shown in detail. The assembly includes an axially disposed cylindrically shaped bearing support 36 about which rotor 26 rotates. Bearing support 36 includes a plurality of internally threaded circumferentially spaced holes 38 at both ends thereof and at least one centered opening 40 through which lubricant and coolant may flow, as is later described in detail.

Mounted circumferentially on and extending substantially the axial length of bearing support 36 are identical and opposing stationary non-rotatable, axially adjustable, circular bearing cones 46 and 48 that may be made of a nickel-copper alloy. Each bearing cone 46, 48 has a facing end 52 and an opposite end 56 including an edge 55. Ends 52 do not abut one another, but rather are spaced apart to form a lubrication gap 53 through which lubricant and coolant may flow, as is described below.

Bearing cones 46, 48 include a radially projecting conical portion 47 having a conical surface 50. When bearing cones 46 and 48 are positioned adjacent each other, as shown in FIG. 3, conical portions 47 are positioned such that their cross-sections form a V-shaped groove 45. Bearing cones 46, 48 are provided with a plurality of bearing journal shoes 44 that may be made of suitable material such as Vespel SP211 obtained from Du Pont. These shoes 44 may be secured to the surface 50 of the bearing cones 46, 48 by a suitable adhesive. The bearing cones also each include a plurality of circumferentially disposed internally threaded holes or openings 54 at end 56.

Figure 4:
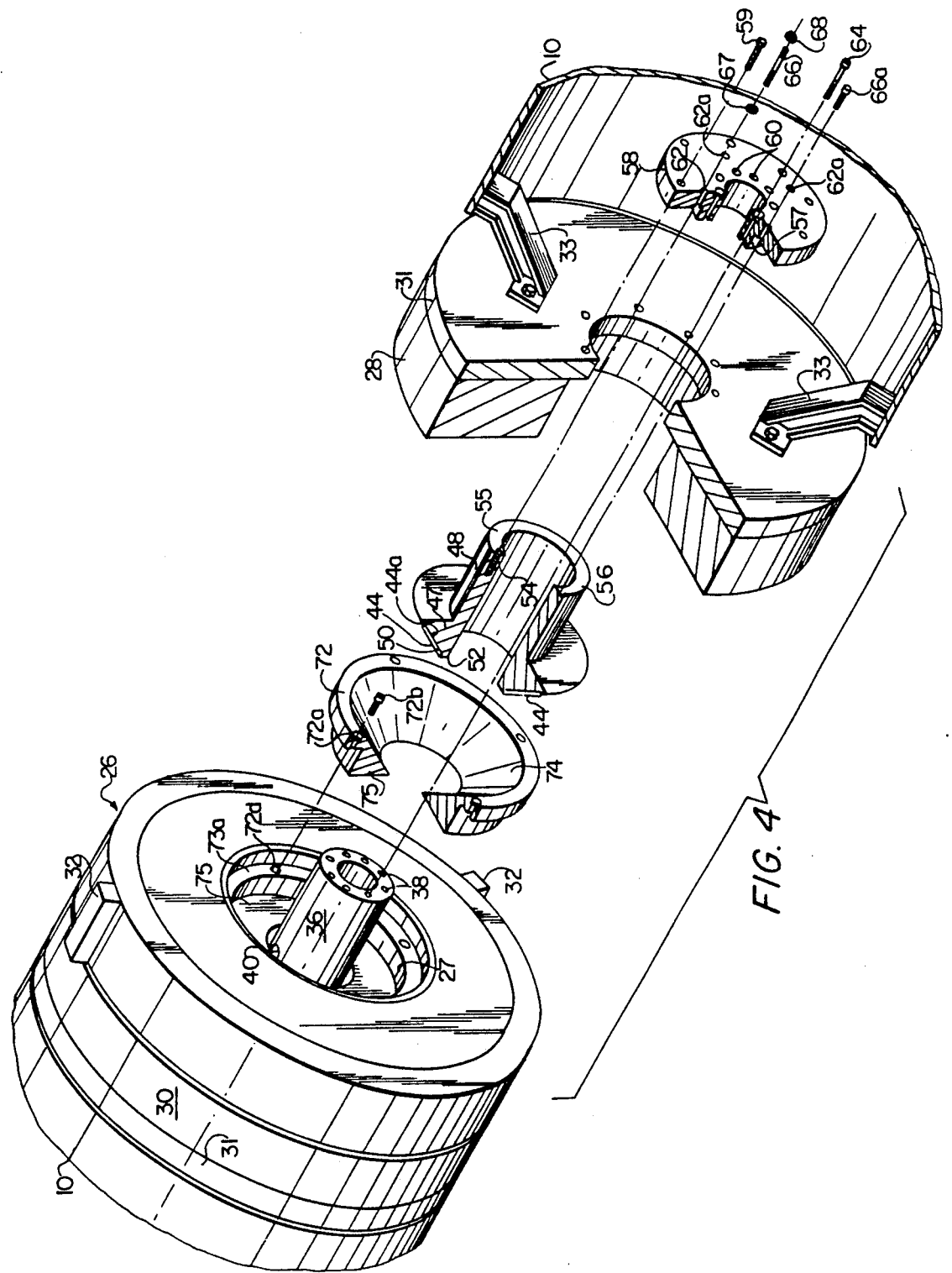
FIG. 4 is an exploded perspective view of the invention of FIGS. 1-3.

As best shown in FIG. 4, a pair of tapered, open center rotating bearing rings 72, 72, together forming a rotating bearing member 90 is provided preferably made from a nickel, aluminum and bronze alloy and each having a plurality of circumferentially spaced bores 72a that accommodate fasteners 72b received into threaded bores 72d in a flange 73a around the inner periphery 27 of rotor 26. Rotating bearing rings 72 abut one another along the surface 75 as shown in FIG. 3. Each rotating bearing ring 72 has a V-shaped surface 74 complementary to V-shaped groove 45 and facing shoes 44. This V-shaped configuration enables the bearing assembly to withstand both radial and axial loads. Alternately bearing rings 72 may be one piece integral with rotor 26.

Bearing support 36 and bearing cones 46 and 48 are held in position relative to end plates 31 by a pair of generally disk-shaped support hubs 58. Support hub 58 includes a first plurality of holes or openings 60 circumferentially spaced to pass through flange 57 and be aligned with the threaded holes or openings 38 of bearing support 36. A plurality of threaded fasteners 64 are received within openings 60 and threaded holes 38 to secure bearing support 36 to support hub 58. Support hub 58 also includes a second and third plurality of holes or openings 62 and 62a, respectively. Holes 62a are threaded. Holes 62 and 62a are alternately spaced about support hub 58 outside the perimeter of flange 57 as is best seen in FIG. 4. Bearing cones 46 and 48 are secured to support hub 58 as follows. Support hub openings 62 are aligned with bearing cone holes 54 within which a plurality of studs 66 are received and retained by lock washers 67 and nuts 68. A plurality of adjusting screws 66a are received in support hub openings 62a. Screws 66a are not received in any holes in the bearing cones, but rather abut the edge 55 of bearing cone 46, 48, as shown in FIG. 3. Support hubs 58 are fastened to end plates 31 by fasteners 59. Alternatively, hubs 58 could be integral with end plates 31.

The bearing assembly of the principal embodiment of the present invention permits the axial adjustment of the stator to rotor gaps and the bearing clearance in the following manner. Adjusting the nuts 68 on studs 66 and screws 66a results in bearing cones 46 and 48 being positioned axially relative to bearing support 36. The two bearing cones 46 and 48 may be moved axially as a unit or independently of one another. The axial movement of the two bearings as a unit results in the axial movement of the rotating bearing rings 72 and the rotor 26, and thus a gap 78, shown in FIG. 3, between the stators 28 and 30 and the rotor 26 may be adjusted. Additionally, the axial movement of one or both of the two bearing cones independently of one another and relative to bearing rings 72 results in the variation of a clearance 80 between the bearing cones 46 or 48 and the rotating bearing rings 72. By adjusting both the nuts 68 on studs 66 and screws 66a around the circumference in a particular pattern, fine adjustment of the assembly is accomplished, including tilting of rotor 26 in two dimensions relative to stators 28 and 30. Locking in of the adjustment of the assembly is accomplished by turning nuts 68 clockwise to pull the bearing cone 48 away from bearing ring 72 while the adjusting screws 66a are turned clockwise to move the bearing cone in the opposite direction. These counteracting forces lock bearing cones 46, 48 and therefore rotor 26 in place relative to bearing support 36 and stators 28, 30.

Lubrication and cooling of the bearing assembly are provided through bearing support lubrication openings 40 and gap 53 between first ends 52 of bearing cones 46 and 48. When a coolant/lubricant is introduced into lubrication openings 40, it travels by centrifugal force within gaps 53, 80 and 78 to be discharged to the exterior of body 10. Bearing rings 72 and rotor 26 may also be provided with passages (not shown) for coolant. In this way, lubricant/coolant is readily supplied to the rotating components.

From the foregoing detailed description, it will be evident that there are a number of modifications of the present invention which could be made. However, it is intended that all such variations not departing from the spirit of the invention be considered as within the scope thereof, limited solely by the appended claims.

I claim:

1. An improved motor and bearing assembly wherein a motor includes a disk-shaped rotor and at least one disk-shaped stator adjacent to the rotor, said rotor and stator being axially aligned along a common longitudinal axis comprising:
   a bearing support;
   bearing cones adjustably mounted on said bearing support and a groove radially disposed between said bearing cones;
   a rotating bearing member disposed within the inner periphery of said rotor and having a complementary configuration to said groove and rotating in said groove whereby radial and axial support for said disk-shaped rotor is provided.

2. The assembly according to claim 1, wherein said groove is of a V-shaped cross-sectional configuration and said complementary configuration of said rotating bearing member is a V-shaped cross-sectional configuration.

3. The assembly according to claim 2, wherein said rotating bearing member includes two rotating bearing rings abutting one another, each of said rotating bearing rings having an angularly disposed surface such that when said two bearing rings are positioned abutting one another, said V-shaped configuration is formed.

4. The assembly according to claim 2, wherein said rotating bearing member includes a rotating bearing ring having two angularly disposed surfaces forming said V-shaped configuration.

5. The assembly according to claim 2, wherein each of said bearing cones has an axial conical surface at a first end thereof, said bearing cones being disposed such that said conical surfaces form said V-shaped groove.

6. The assembly according to claim 1, wherein said rotating bearing member includes a pair of rotating bearing rings abutting one another.

7. The assembly according to claim 1, wherein said rotating bearing member includes a rotating tapered bearing ring.

8. The assembly according to claim 1, wherein said rotating bearing member is secured to said rotor.

9. The assembly according to claim 1, wherein said bearing cones are axially movable on and relative to said bearing support.

10. The assembly according to claim 9, wherein said movement of at least one of said bearing cones causes said rotating bearing member and said rotor to move axially relative to said bearing support.

11. The assembly according to claim 10, further comprising a gap between said rotor and said stator and means for varying said gap.

12. The assembly according to claim 11, wherein said varying means comprises moving said bearing cones and said rotor axially.

13. The assembly according to claim 9, wherein said rotating bearing member and said rotor are axially movable relative to said bearing support when said bearing cones are moved as a unit.

14. The assembly according to claim 13, further including a gap between said rotor and said stator and means for varying said gap.

15. The assembly according to claim 14, wherein said varying means comprises moving said bearing cones and said rotor axially.

16. The assembly according to claim 1, further comprising means for adjusting the location of said bearing cones relative to said rotating bearing member.

17. The assembly according to claim 16, wherein said bearing cones include a plurality of internally threaded holes on an end thereof, said assembly further comprising a support hub and a plurality of studs, said bearing support being mounted on said support hub, said support hub including a plurality of openings registrable with said threaded holes through which said studs pass said support hub also including a second plurality of threaded openings through which a plurality of screws pass, said screws abutting said bearing cones, said adjusting means comprising said plurality of studs and said plurality of screws.

18. The assembly according to claim 17, wherein said bearing support includes a plurality of internally threaded holes and said support hub also includes a plurality of openings registrable with said bearing support holes, said assembly further including a plurality of fasteners received in said support hub openings and said bearing support holes to secure said bearing support to said support hub, said bearing cones being axially movable relative to said bearing support and said support hub.

19. The assembly according to claim 18, wherein the support hub is fastened to said end plate.

20. The assembly according to claim 18, wherein said support hub is integral with said end plate.

21. The assembly according to claim 17, further comprising an plate adjacent to said stator.

22. The assembly according to claim 16, wherein each of said bearing cones includes a plurality of internally threaded holes on an end thereof, said assembly further comprising a pair of support hubs and a plurality of studs, said bearing support being mounted on said pair of support hubs, each of said support hubs including a plurality of openings registrable with s id threaded holes of said bearing cones through which said studs pass, each of said support hubs also including a second plurality of openings in said support hub through which a plurality of screws pass, said screws abutting said bearing cones, said adjusting means comprising said plurality of studs and said plurality of screws.

23. The assembly according to claim 22, wherein said bearing support includes a plurality of internally threaded holes and each of said support hubs also includes a plurality of openings registrable with said bearing support holes, said assembly further including a plurality of fasteners received in said support hub openings and said bearing support holes, said bearing support being secured to said support hub, and said bearing cones being axially movable relative to said support hubs.

24. The assembly according to claim 22, further comprising a pair of stators and a pair of end plates, each stator adjacent to one side of said rotor, each of said end plates being adjacent to and supporting one of said stators.

25. The assembly according to claim 24, wherein each of said support hubs is fastened to one of said end plates.

26. The assembly according to claim 24, wherein each of said support hubs is integral with one of said end plates.

27. The assembly according to claim 1, wherein said bearing member comprises a pair of axially movable bearing rings.

28. The assembly according to claim 27, wherein a clearance for lubrication or cooling is formed between each of said bearing rings and the adjacent bearing cone, a ga registrable with said clearance is formed between adjacent ends of said bearing cones, and said bearing support includes at least a lubricant or cooling hole registrable with said gap.

29. The assembly according to claim 1, wherein said bearing member comprises an axially movable bearing ring.

30. The assembly according to claim 29, wherein a clearance for lubrication is formed between said bearing ring and the adjacent bearing cones, a gap registrable with said clearance is formed between adjacent ends of said bearing cones, and said bearing support includes at least a lubricant or cooling hole registrable with said gap.

31. The assembly according to claim 1, wherein each of said bearing cones is independently axially movable on said bearing support relative to said rotating bearing member.

32. The assembly according to claim 31, further including a clearance between said bearing cones and said rotating bearing member and means for varying said clearance by moving one of said bearing cones.

33. The assembly according to claim 32, wherein said bearing support includes at least a lubricant or cooling hole communicable with a gap formed between adjacent ends of said bearing cones and said clearance.

34. The assembly according to claim 31, further comprising means for adjusting the location of said bearing cones relative to said rotating bearing member.

35. The assembly according to claim 34, further comprising a pair of support hubs to which said bearing cones are secured, said bearing support having a plurality of internally threaded holes, each of said support hubs including a plurality of openings registrable with said bearing support threaded holes, said assembly further including a plurality of screws received in said bearing support holes and said support hub openings, thereby securing said bearing support to said support hubs, and said bearing cones being axially movable relative to said support hub.

36. The assembly according to claim 1, wherein a clearance for lubrication and cooling is formed between said rotating bearing member and said bearing cones, and a gap registrable with said clearance is formed between adjacent ends of said bearing cones, and said bearing support includes a lubricant or coolant hole registrable with said gap.

* * * * *

UNITED STATES PATENT AND TRADEMARK OFFICE
CERTIFICATE OF CORRECTION

PATENT NO. : 5,286,116
DATED : February 15, 1994
INVENTOR(S) : Chester A. Garis, Jr.

It is certified that error appears in the above-indentified patent and that said Letters Patent is hereby corrected as shown below:

```
Column 5, Claim 21, line 2, after "an" insert -- end --.
Column 5, Claim 22, line 7, delete "s Id" and insert -- said --.
Column 6, Claim 28, line 4, delete "ga" and insert -- gap --.
```

Signed and Sealed this

Nineteenth Day of July, 1994

Attest:

BRUCE LEHMAN

*Attesting Officer*  *Commissioner of Patents and Trademarks*